UNITED STATES PATENT OFFICE.

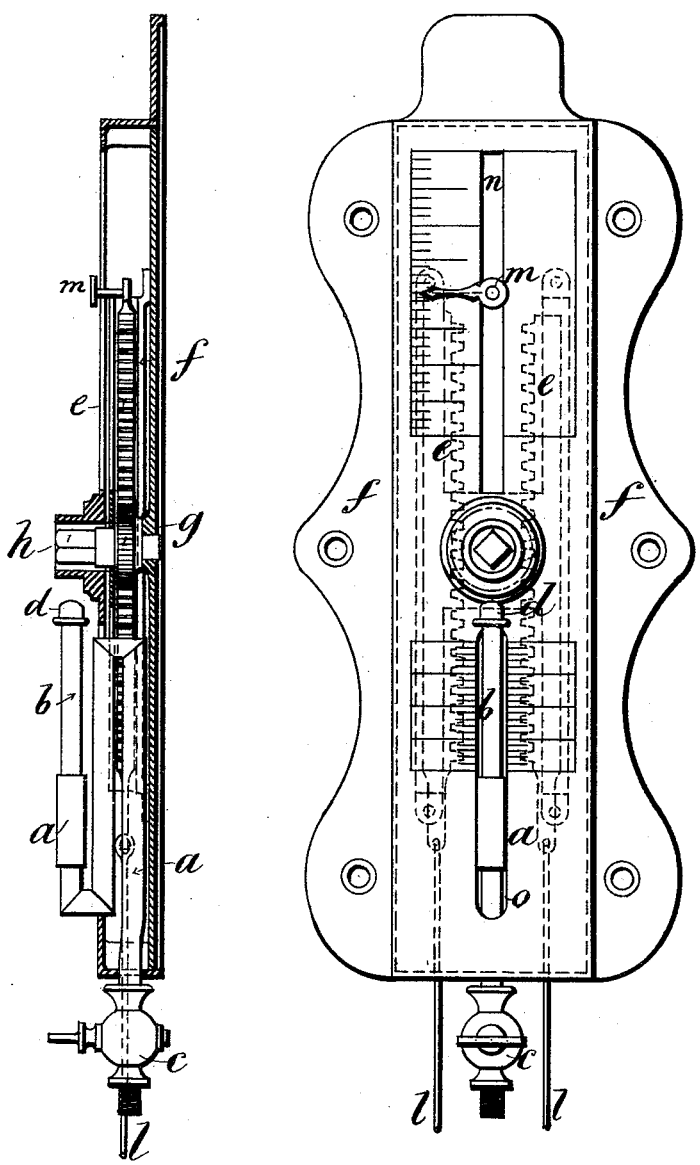

GEORGE BRIER FEARNLEY, OF BRIXTON, COUNTY OF SURREY, ENGLAND.

GAS-PRESSURE GAGE AND REGULATOR.

SPECIFICATION forming part of Letters Patent No. 406,894, dated July 16, 1889.

Application filed July 14, 1887. Serial No. 244,243. (No model.) Patented in England July 15, 1886, No. 9,209; in France April 29, 1887, No. 170,277; in Belgium April 29, 1887, No. 77,260; in Germany April 29, 1887, No. 3,207, and in Austria-Hungary May 3, 1887, No. 7,337 and No. 21,106.

*To all whom it may concern:*

Be it known that I, GEORGE BRIER FEARNLEY, a subject of the Queen of Great Britain and Ireland, and a resident of Brixton, in the county of Surrey, England, have invented certain Improvements in Gas-Regulators, (for which I have applied for a British patent, No. 9,209, dated July 15, 1886; a French patent, No. 170,277, dated April 29, 1887; a Belgian patent, No. 77,260, dated April 29, 1887; a German patent, No. 3,207, dated April 29, 1887, and an Austro-Hungarian patent, No. 7,337 and No. 21,106, dated May 3, 1887,) of which the following is a specification.

My invention for improvements in gas-regulators has for its object to provide efficient means whereby the pressure of the gas to be consumed can readily be regulated from any convenient place to the required degree to give the maximum of illumination for the minimum consumption of gas, whatever the pressure of gas in the mains may be.

Apparatus constructed according to my invention consists of the combination of a pressure-gage for determining the pressure of the gas to be consumed with means for operating the ordinary meter or other suitable supply tap or cock for regulating the pressure, as required. The apparatus is fixed in any convenient place, and the pressure-gage is connected to the gas-supply pipe to indicate the pressure at which the gas is being consumed. Two racks capable of sliding longitudinally in the framing of the apparatus are operated by a pinion arranged centrally between them, and are connected by cords or wires to the opposite ends of a lever, or to a pulley secured to the plug of the aforesaid tap or cock. It will thus be seen that by operating the pinion by means of a handle or key the tap or cock can be turned to admit more or less gas to regulate the pressure of the gas to be consumed, so as to give the maximum amount of illumination, this point being indicated on the pressure-gage. A pointer attached to one of the racks moves over a graduated scale and shows the position of the plug of the supply tap or cock.

In the accompanying drawings, Figure 1 is a front elevation of apparatus constructed according to my invention, and Fig. 2 is a sectional side elevation of the same.

The pressure-gage consists of a bent tube formed partly of metal $a$ and partly of glass $b$. The tube $a$ is connected to the gas-supply pipe, which contains or is to contain the gas at the pressure at which it is to be consumed through the small tap or cock $c$. The top of the glass tube $b$ is closed by a metal cap $d$, which is perforated with a small hole. The tube $a$ contains a small quantity of water at its lowest bend. It will thus be seen that when the gas is admitted through the cock $c$ this water will be caused to rise in the glass tube $b$, behind which is a suitably graduated scale to indicate the pressure, as clearly shown; or the tube itself may be graduated.

The means for operating the meter or supply-cock comprises two racks $e$, capable of sliding in the framing $f$, and gearing with a pinion $g$, arranged centrally between them. The pinion $g$ is fixed on a spindle $h$, which can be turned in either direction by means of a handle or key. When the pinion $g$ is turned in one direction or the other, the two racks $e$ slide in the opposite directions. These said racks are connected by cords or wires to the opposite ends of a lever, or to a pulley secured on the plug of the meter or supply-cock admitting the gas to the supply-pipe, the pressure in which is to be regulated. One of the racks $e$ has fixed to it a pointer $m$, moving over a graduated scale to indicate the position of the meter or supply-cock passage. The pressure-gage and racks and operating mechanism are arranged in the framing $f$, which is graduated, as shown, and is provided with a slot $n$ for the pointer $m$, a slot $o$ for the pressure-gage $a$ $b$, and with suitable holes for the spindle $h$, tube $a$, and cords or wires $l$.

In using my apparatus the cock or tap $c$ is turned to admit the gas to the tube $a$, and the spindle $h$ is then turned until the pressure, as indicated by the height of the water in the tube $b$, is at the required degree. It will thus be seen that the gas can be consumed at the most economical pressure and that this pressure can readily be regulated from any suitable room or place, the apparatus being only connected to the meter or supply-cock through the two cords or wires $l$, which can be run as desired, and which are not liable to break or become deranged, as the pull on them is in the direct line of their length.

I claim as my invention and desire to secure by Letters Patent—

In a gas-regulator, the combination, with a pressure-gage consisting of an entry-valve $c$, and a bent tube comprising one part $a$ of metal and one part $b$ of glass, graduated, as specified, means for introducing gas into said pressure-gage, substantially as set forth, and a supporting-frame by which the apparatus is held in position, of the racks $e$, sliding in the frame $f$, the spindle $h$, journaled in said frame between said racks, the pinion $g$, mounted on said spindle and meshing into said racks, the index $m$, carried by one of said racks and adapted to move upon a graduated scale, and means, substantially as specified, for connecting said racks with the key of a gas-supply cock, all substantially as and for the purpose set forth.

In testimony whereof I have signed my name to this specification in the presence of two subscribing witnesses.

GEORGE BRIER FEARNLEY.

Witnesses:
WALTER J. SKERTEN,
HERBERT E. DALE.